United States Patent
Martin et al.

(10) Patent No.: US 10,624,140 B2
(45) Date of Patent: Apr. 14, 2020

(54) COMMUNICATIONS DEVICE

(71) Applicant: SONY CORPORATION, Tokyo (JP)

(72) Inventors: Brian Alexander Martin, Basingstoke (GB); Matthew William Webb, Basingstoke (GB); Yuichi Morioka, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 180 days.

(21) Appl. No.: 15/113,667

(22) PCT Filed: Dec. 24, 2014

(86) PCT No.: PCT/EP2014/079335
§ 371 (c)(1),
(2) Date: Jul. 22, 2016

(87) PCT Pub. No.: WO2015/113719
PCT Pub. Date: Aug. 6, 2015

(65) Prior Publication Data
US 2017/0013655 A1  Jan. 12, 2017

(30) Foreign Application Priority Data
Jan. 31, 2014 (EP) ..................................... 14153540

(51) Int. Cl.
*H04W 76/14* (2018.01)
*H04W 72/08* (2009.01)
(Continued)

(52) U.S. Cl.
CPC ........... *H04W 76/14* (2018.02); *H04L 5/0033* (2013.01); *H04L 5/0094* (2013.01);
(Continued)

(58) Field of Classification Search
CPC ... H04W 72/082; H04W 88/02; H04W 92/18; H04W 72/04; H04W 24/08; H04W 24/10;
(Continued)

(56) References Cited

U.S. PATENT DOCUMENTS

| 2012/0300662 A1 | 11/2012 | Wang et al. | |
| 2012/0322478 A1* | 12/2012 | Jagger | H04B 1/1036 |
| | | | 455/501 |

(Continued)

FOREIGN PATENT DOCUMENTS

| WO | 2013/176592 A1 | 11/2013 |
| WO | 2015/063105 A1 | 5/2015 |
| WO | 2015/063106 A1 | 5/2015 |

OTHER PUBLICATIONS

"CSMA/CA based resource selection", Samsung, 3GPP TSG-RAN WG2 #84, R2-133840, Nov. 2013, (4 pages).
(Continued)

*Primary Examiner* — Yemane Mesfin
*Assistant Examiner* — Mon Cheri S Davenport
(74) *Attorney, Agent, or Firm* — Xsensus LLP

(57) ABSTRACT

A communications device comprising a transmitter for transmitting signals representing device-to-device communications to a second communications device across a wireless access interface, a receiver for receiving signals representing device-to-device communication from the second communications device across the wireless access interface, the wireless access interface including a control resource for communicating control data between communications devices and a data resource for communicating user data between communications devices, the control data providing scheduling assignments for the allocation of resources of the data resource, and a controller for controlling the transmitter and the receiver to perform interference detection in one or more of the control resource and the data resource, and to
(Continued)

transmit in the control resources, in response to detecting interference in one or more of the control resource and the data resource, signals representing an indication of the detected interference to the second communications device.

15 Claims, 11 Drawing Sheets

(51) Int. Cl.
    *H04L 5/00*         (2006.01)
    *H04W 72/04*      (2009.01)

(52) U.S. Cl.
    CPC ..... *H04W 72/0446* (2013.01); *H04W 72/085* (2013.01); *H04L 5/0007* (2013.01); *H04L 5/0062* (2013.01)

(58) Field of Classification Search
    CPC .............. H04W 72/12; H04W 72/0446; H04W 72/0453; H04L 1/0027; H04B 17/345
    See application file for complete search history.

(56) References Cited

U.S. PATENT DOCUMENTS

| | | | |
|---|---|---|---|
| 2013/0170387 A1 | 7/2013 | Wang et al. | |
| 2013/0308549 A1* | 11/2013 | Madan | H04W 28/26 370/329 |
| 2013/0322277 A1* | 12/2013 | Vanganuru | H04W 24/08 370/252 |
| 2014/0018121 A1 | 1/2014 | Kang et al. | |

OTHER PUBLICATIONS

"Network control for Public Safety D2D Communications", Orange, Huawei, HiSilicon, Telecom Italia, 3GPP TSG-RAN WG2 Meeting #84, R2-133990, Nov. 2013, (5 pages).

"The Synchronizing Central Node for Out of Coverage D2D Communication", General Dynamics Broadband UK, 3GPP TSG-RAN2 #84, R2-134246, Nov. 2013, (3 pages).

"Medium Access for D2D Communication", LG Electronics Inc, 3GPP TSG-RAN WG2 #84, R2-134426, Nov. 2013, (9 pages).

"D2D Scheduling Procedure", Ericsson, 3GPP TSG-RAN WG2 #84, Tdoc R2-134238, Nov. 2013, (7 pages).

"Possible mechanism for resource selection in connectionless D2D voice communication", General Dynamics Broadband UK, 3GPP TSG-RAN2 #84, R2-134248, Nov. 2013, (9 pages).

"Simulation results for D2D voice services using connectionless approach", General Dynamics Broadband UK, 3GPP TSG-RAN2 #84, R2-134431, Nov. 2013, (6 pages).

Ran Xiaogang, et al., "D2D Resource Allocation under the Control of BS", University of Electronic Science and Technology of China, https://mentor.ieee.org/802.16/dcn/13/16-13-0123-02-000n-d2d-resource-allocation-under-the-control-of-bs.docx , Uploaded to IEEE on Aug. 10, 2013, (7 pages).

Harri Holma, et al., "LTE for UMTS OFDMA and SC-FDMA Based Radio Access", Wiley, 2009, (4 pages).

"Study on LTE Device to Device Proximity Services", Qualcomm Incorporated, 3GPP TSG RAN Meeting #58, RP-122009, Dec. 2012, (7 pages).

"Agreements from TSG RAN on work on Public Safety related use cases in Release 12", Vodafone, et al., TSG RAN Meeting #61, RP-13177, Sep. 2013, (6 sheets).

"$3^{rd}$ Generation Partnership Project; Technical Specification Group Services System Aspects; Study on architecture enhancements to support Proximity-based Services (ProSe) (Release 12)", 3GPP TR 23.703, V1.0.0, Dec. 2013, (275 pages).

"$3^{rd}$ Generation Partnership Project; Technical Specification Group Core Network and Terminals; Interworking between the Public Land Mobile Network (PLMN) supporting packet based services and Packet Data Networks (PDN) (Release 10)", 3GPP TS 29.061, V10.0.0, Sep. 2010, (155 pages).

Kwang-Cheng Chen, et al., "Machine-to-machine communications: Technologies and challenges", Elsevier, Ad Hoc Networks, vol. 18, 2014, (21 pages).

International Search Report dated Apr. 1, 2015 for PCT/EP2014/079335 filed on Dec. 24, 2014.

* cited by examiner

COMMUNICATIONS DEVICE

CROSS-REFERENCE TO RELATED APPLICATIONS

The present application claims priority to European Patent Application No. 14 153 540.1, filed in the European Patent Office on Jan. 31, 2014, the entire contents of which are hereby incorporated by reference herein in entirety.

FIELD OF THE DISCLOSURE

The present disclosure relates to device-to-device communications and in particular to communications devices and methods for device-to-device communications.

BACKGROUND OF THE DISCLOSURE

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications will be introduced. D2D communications allow communications devices that are in close proximity to directly communicate with each other, both when within and when outside of a coverage area. This D2D communications ability may allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area or when the network fails. Fourth generation networks have therefore been proposed as a cost effective solution to public safety communications compared to dedicated systems such as TETRA which are currently used throughout the world. However, the potential coexistence of conventional LTE communications and multiple groups of D2D communications devices in close proximity may increase the complexity of coordinating communications and resource allocation for D2D communications.

SUMMARY OF THE DISCLOSURE

In accordance with an example of the present disclosure there is provided a communications device comprising a transmitter for transmitting signals representing device-to-device communications to a second communications device across a wireless access interface, and a receiver for receiving signals representing device-to-device communication from the second communications device across the wireless access interface, the wireless access interface including a control resource for communicating control data between communications devices and a data resource for communicating user data between communications devices, the control data providing scheduling assignments for the allocation of resources of the data resource. The communications device also comprises a controller for controlling the transmitter and the receiver to perform interference detection in one or more of the control resource and the data resource, and to transmit in the control resources, in response to detecting interference in one or more of the control resource and the data resource, signals representing an indication of the detected interference to the second communications device.

The provision of a mechanism where a device-to-device (D2D) communications device may inform other communications devices of interference present in a D2D wireless access interface enables transmitting communications devices to be aware of interference that only receiving communications devices may be experiencing. By virtue of reporting the interference, transmitting communications devices may adjust the resources that they use for transmission so that interference at receiving communications devices is circumvented and the 'hidden node' interference problem overcome. Furthermore, by providing indications of interference directly to other communications devices a central coordinating entity is not required. Consequently, for communications devices which operate in accordance with LTE, a connection with a base station is not required for resource allocation and interference detection, thus allowing the communications devices to operate outside of LTE coverage areas. The interference detected may originate from any source and therefore the interference detection and reporting procedure enables device-to-device communications devices to coexist with a wide range of compatible and non-compatible wireless communications systems.

In accordance with another example the control resource includes one or more scheduling assignment blocks and the data resource includes one or more traffic resource blocks, each scheduling assignment block being mapped to a traffic resource block according to a predetermined mapping whereby scheduling assignments for a traffic resource block are transmitted in the corresponding scheduling assignment block, and the controller is configured to control the transmitter to transmit, in response to detecting interference in at least one traffic resource block, signals representing an indication of the interference in one or more scheduling assignment blocks that map to the at least one traffic resource block.

In accordance with another example the signals representing an indication of the interference are a scheduling assignment for the communications device, the scheduling assignment indicating the resources blocks in a frequency range in which the interference was detected.

In accordance with another example the control resource includes one or more scheduling assignment blocks and one or more corresponding interference reporting blocks, and the data resource includes a plurality of traffic resource blocks, each corresponding scheduling assignment block and interference reporting block being mapped to a traffic resource block according to a predetermined mapping, and the controller is configured to control the transmitter to transmit, in response to detecting interference in at least one traffic resource block, the signals representing an indication of the interference in one or more interference reporting blocks that map to the at least one traffic resource block.

In accordance with another example the controller is configured to control the transmitter to transmit the signals representing an indication of the detected interference in accordance with a predefined probability.

In accordance with another example the controller is configured to control the transmitter to transmit the signals representing an indication of the interference in conjunction with a predefined identifying sequence, the sequence being associated with the communications device.

In accordance with another example the interference detection includes detecting a radio-frequency signal in one or more of the control resource and the data resource.

In accordance with another example the signals representing an indication of the interference include information on the characteristics of the detected interference.

In accordance with another example the control resource includes one or more scheduling assignment blocks and a plurality of corresponding interference reporting blocks, and the data resource includes one or more traffic resource blocks, each corresponding scheduling assignment block and interference reporting block being mapped to a traffic resource block according to a predetermined mapping, and the controller is configured to control the transmitter to transmit, in response to detecting interference in at least one scheduling assignment block, the signals representing an indication of the interference in one or more interference reporting blocks that correspond to the at least one scheduling assignment block.

Various further aspects and embodiments of the disclosure are provided in the appended claims, including but not limited to methods for performing device-to-device communications.

BRIEF DESCRIPTION OF THE DRAWINGS

Embodiments of the present disclosure will now be described by way of example only with reference to the accompanying drawings in which like parts are provided with corresponding reference numerals and in which.

DETAILED DESCRIPTION OF EXAMPLE EMBODIMENTS

Conventional Communications System

Figure 1:
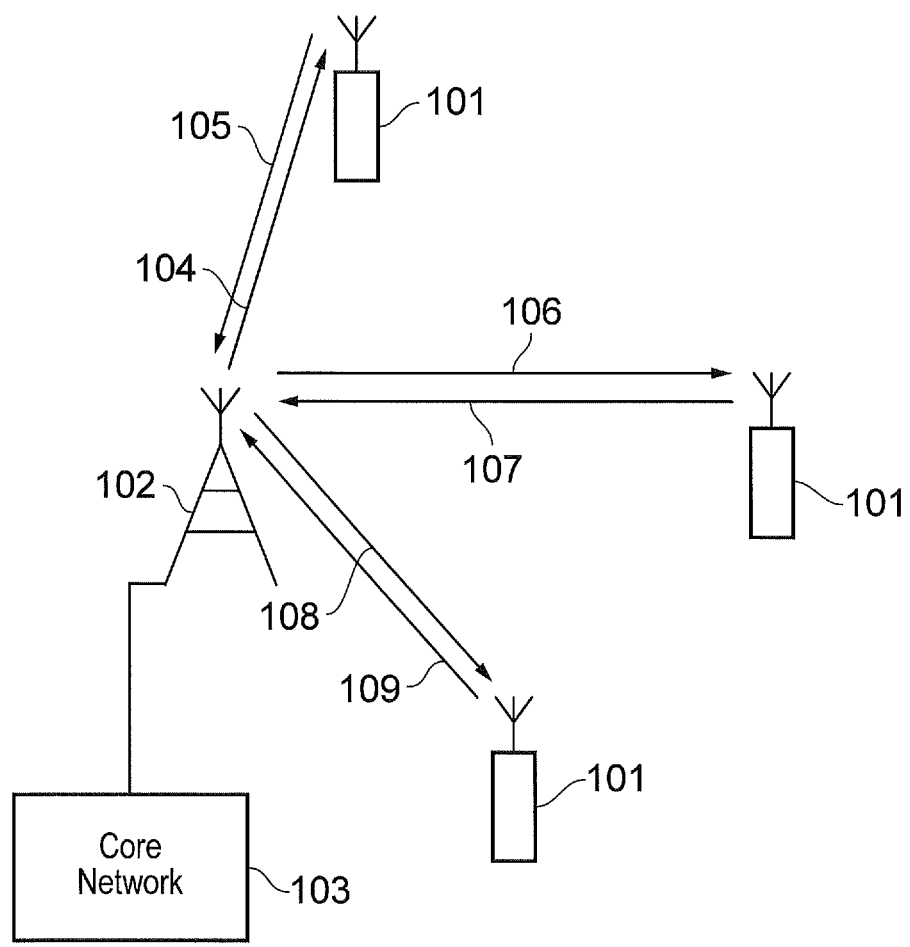
FIG. 1 provides a schematic diagram of a mobile communications system.

FIG. 1 provides a schematic diagram of a conventional mobile telecommunications system 100, where the system includes mobile communications devices 101, infrastructure equipment 102 and a core network 103. The infrastructure equipment may also be referred to as a base station, network element, enhanced node B (eNodeB) or a coordinating entity for example, and provides a wireless access interface to the one or more communications devices within a coverage area or cell. The one or more mobile communications devices may communicate data via the transmission and reception of signals representing data using the wireless access interface. The network entity 102 is communicatively linked to the core network 103 where the core network may be connected to one or more other communications systems or networks which have a similar structure to that formed from communications devices 101 and infrastructure equipment 102. The core network may also provide functionality including authentication, mobility management, charging and so on for the communications devices served by the network entity. The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications devices and 105, 107 and 109 represent the uplink communications from the communications devices to the network entity. The communications system 100 may operate in accordance with any known protocol, for instance in some examples the system 100 may operate in accordance with the 3GPP Long Term Evolution (LTE) standard where the network entity and communications devices are commonly referred to as eNodeB and UEs, respectively.

Figure 2:
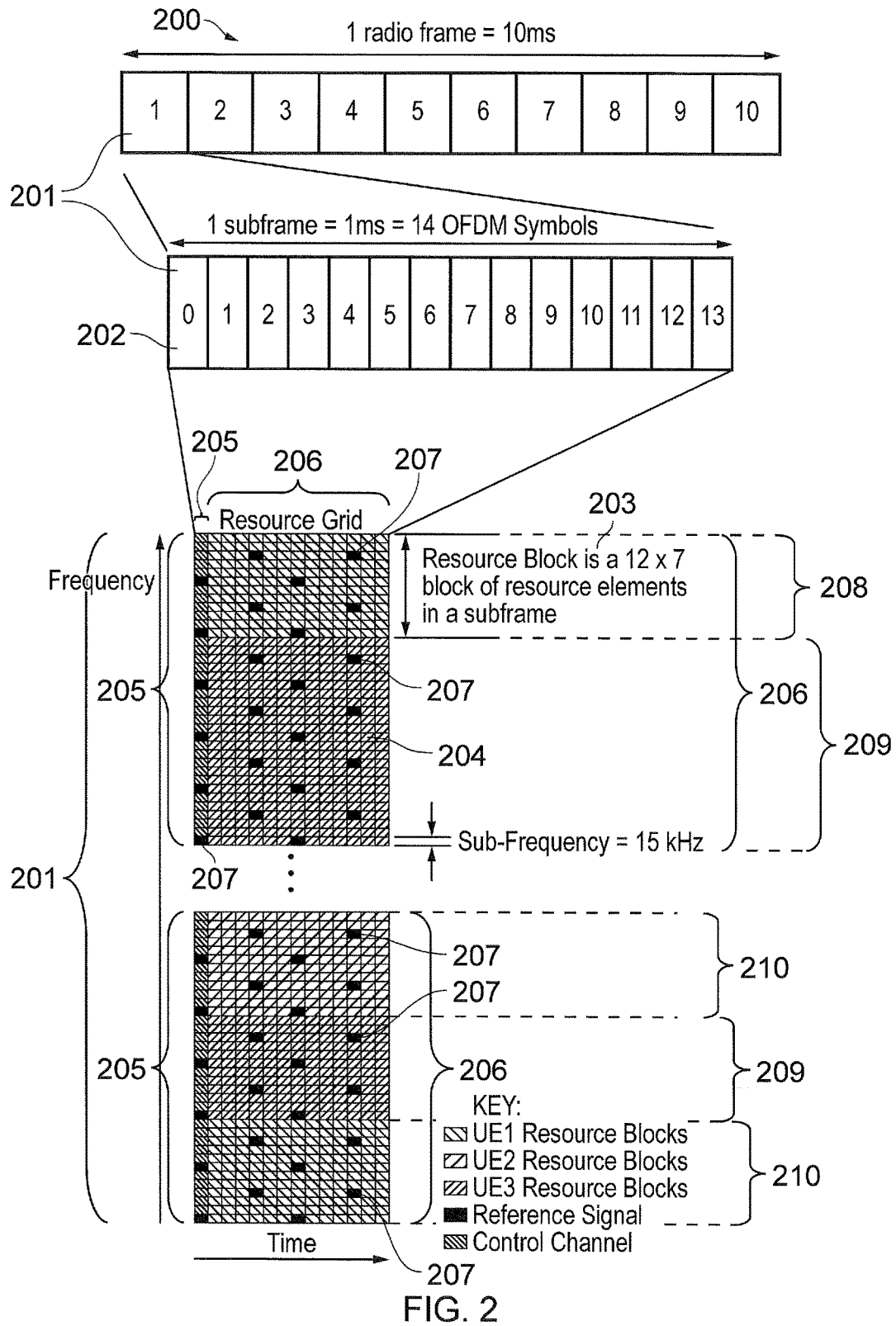
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 last 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals, which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data, such as a physical downlink shared channel (PDSCH) and a physical broadcast channel (PBCH). Further information on the structure and functioning of the physical channels of LTE systems can be found in [11].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH. In order to achieve this, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
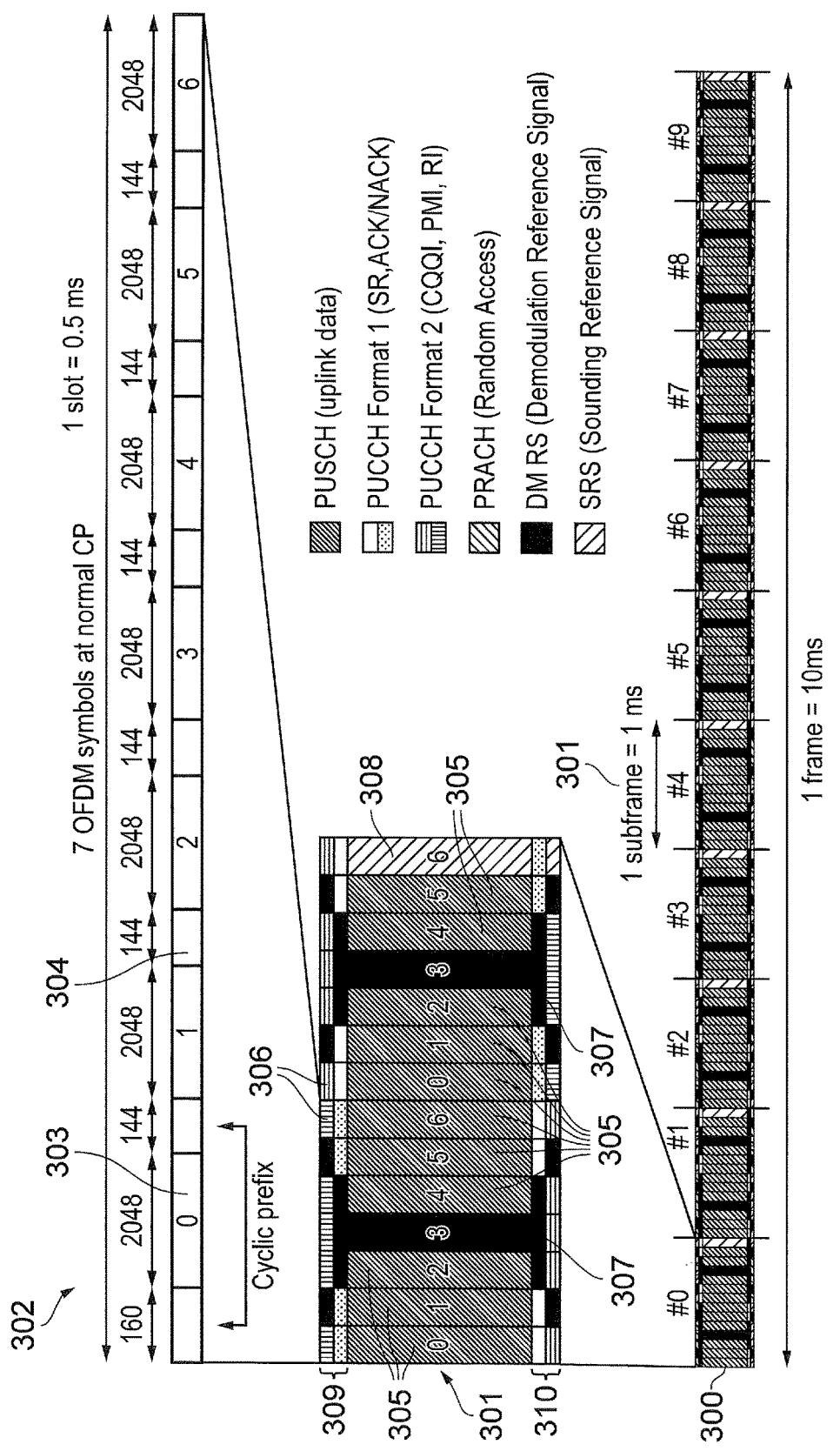
FIG. 3 provides a schematic diagram of the structure an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [11].

In an analogous manner to the resources of the PDSCH, resources of the PUSCH are required to be scheduled or granted by the serving eNodeB. Therefore if data is to be transmitted by a UE, resources of the PUSCH are required to be granted to the UE by the eNodeB, where uplink grants may be indicated to a UE via DCI conveyed by the PDDCH. Uplink resources may be granted by an eNodeB in a number of circumstances, for example a grant may be provided in response to a UE transmitting a scheduling request or a buffer status report to its serving eNodeB.

Although similar in structure to downlink subframes, uplink subframes have a different control structure to downlink subframes, in particular the upper 309 and lower 310 subcarriers/frequencies/resource blocks of an uplink subframe are reserved for control signalling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocations are contiguous. However, in SC-FDM subcarriers are modulated in combination and therefore if efficient use of the available resources is to be made, contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

Device-to-Device Communications

D2D communications offer the possibility to address the aforementioned problems of network capacity and the requirement of network coverage for communications between LTE devices. For example, if user data can be communicated directly between UEs only one set of resource is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
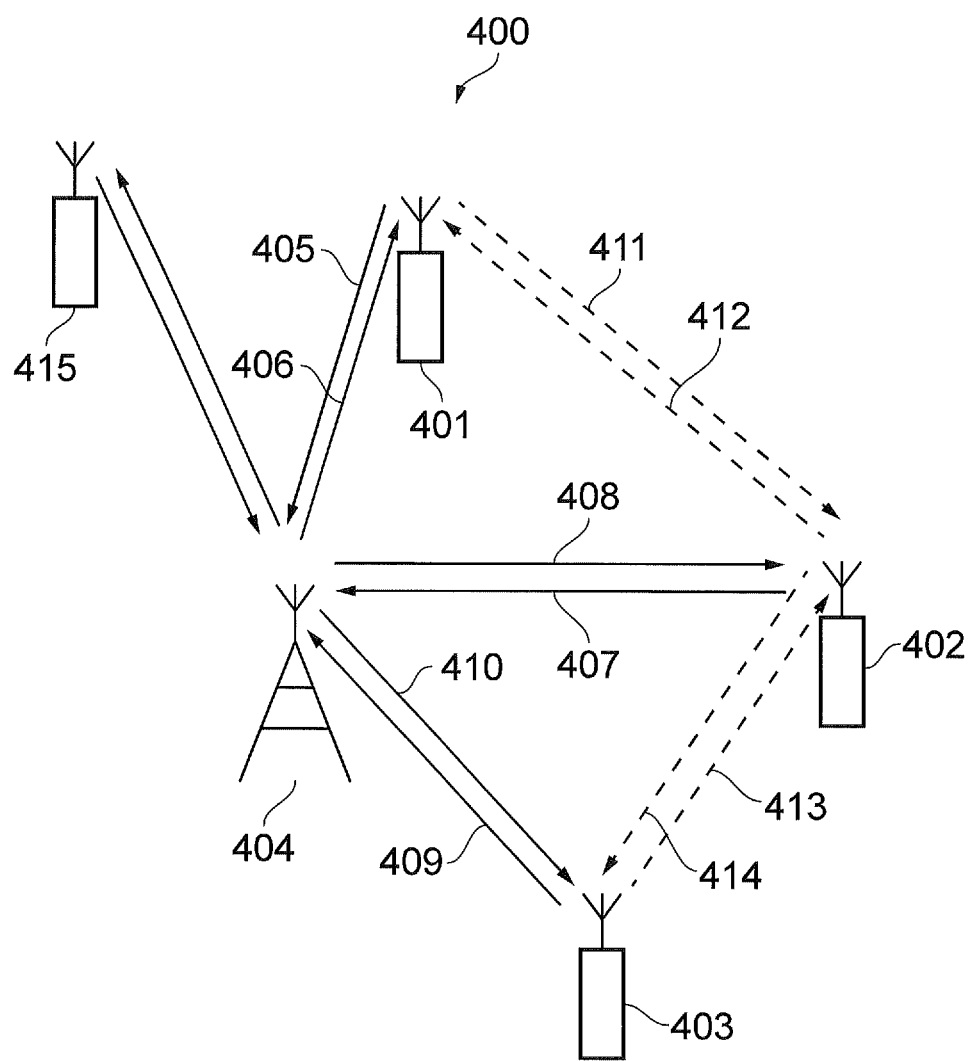
FIG. 4 provides a schematic diagram of a mobile communications system in which communications devices are operable to perform device-to-device communications.

FIG. 4 provides a schematic diagram of a mobile communications system 400 that is substantially similar to that described with reference to FIG. 1 but where the UEs 401 402 403 are also operable to perform direct device-to-device (D2D) communications with one another. D2D communications comprise UEs directly communicating data between one another without user and or control data being communicated via a dedicated coordinating entity such as an eNodeB. For example, in FIG. 4 communications between the UEs 401 402 403 415 and the eNodeB 304 are in accordance with the existing LTE standard, but as well as communicating via the uplink and downlinks 405 to 410, when the UEs 401 to 403 are within range of each other they may also communicate directly with one another via the D2D communication links 411 to 414. In FIG. 4 D2D communications links are indicated by dashed lines and are shown to exist between 401 and 402, and 402 and 403 but not between 401 and 403 because these UEs are not sufficiently close together to directly transmit and receive signals to and from one another. D2D communications links are also shown not to exist between 415 and other UEs because UE 415 is not capable of D2D communications. A situation such as that illustrated in FIG. 4 may exist in an LTE network where UE 415 is a legacy device not compliant with the specifications for D2D operation.

In FIG. 4, if UE 402 wishes to perform D2D communications with UE 414 as illustrated by the D2D communications link 414, UE 402 may follow a number of possible approaches. In a first example approach, UE 402 may begin broadcasting the data it wishes to transmit without knowledge of whether there are potential receiving UEs within range. Consequently, little or no setup procedure is required. However, although simple, such an approach may have a recued probability of a successful transmission as no information is available to UE 402 on the recipients of the transmission. In an alternative approach it may beneficial if the transmitting UE 402 acquires knowledge of the other D2D capable UEs within range. In an LTE system this may be achieved for example by each UE periodically transmitting a discovery signal containing a unique "discovery" identifier that identifies UEs to one another. Alternatively, a serving eNodeB or coordinating entity may compile a list of UEs within its coverage area capable of performing D2D communications and distribute the list to the appropriate UEs within its coverage area. By virtue of either of the above processes the UE 401 may discover UE 402, UE 402 may discover UEs 401 and 403, and UE 403 may discover UE 402. Once UE 402 is aware of the existence of UE 403, UE 402 may then proceed to transmit data in accordance with any suitable resource allocation procedure.

Previously Proposed D2D Systems

It has previously been proposed to provide some arrangement for D2D communication within standards which define communications systems according to LTE. A number of possible approaches to the implementation of LTE D2D communications exist. For example, the wireless access interface provided for communications between UEs and eNodeB may be used for D2D communications, where an eNodeB allocates the required resources and control signalling is communicated via the eNodeB but user data is transmitted directly between UEs.

The wireless access interface utilised for D2D communications may be provided in accordance with any of a number of techniques, such as carrier sense multiple access (CSMA), OFDM or a combination thereof for example as well as an OFDM/SC-FDMA 3GPP LTE based wireless access interface. For example it has been proposed in document R2-133840 [1] to use a Carrier Sensed Multiple Access, CSMA, co-ordinations of transmission by UEs, which is un-coordinated/contention based scheduling by each UE. Each UE first listens then transmits on an unused resource.

In another example, UEs may communicate with each other by negotiating access to a wireless access interface directly, thus overcoming the need for a coordinating eNodeB. Examples of previously proposed arrangements include those in which one of the UEs of the group acts as a controlling entity to co-ordinate the transmissions of the other members of the group. Examples of such proposals are provided in the following disclosures:

[2] R2-133990, Network control for Public Safety D2D Communications; Orange, Huawei, HiSilicon, Telecom Italia
 [3] R2-134246, The Synchronizing Central Node for Out of Coverage D2D Communication; General Dynamics Broadband UK
 [4] R2-134426, Medium Access for D2D communication; LG Electronics Inc In another arrangement one of the UEs of the group first sends a scheduling assignment, and then transmits data without a central scheduling UE or controlling entity controlling the transmissions. The following disclosures provide examples of this de-centralised arrangement:

[5] R2-134238, D2D Scheduling Procedure; Ericsson;
[6] R2-134248, Possible mechanisms for resource selection in connectionless D2D voice communication; General Dynamics Broadband UK;
[7] R2-134431, Simulation results for D2D voice services using connectionless approach General Dynamics Broadband UK In particular, the last two contributions listed above, R2-134248 [6], R2-134431 [7], disclose the use of a scheduling channel, used by UEs to indicate their intention to schedule data along with the resources that will be used. The other disclosure, R2-134238 [5], does not use a scheduling channel as such, but deploys at least some predefined resources to send the scheduling assignments.

Other example arrangements disclosed in [8] and [9] require a base station to provide feedback to the communications devices to control their transmissions. Document [10] discloses an arrangement in which a dedicated resource exchanging channel is provided between cellular user equipment and device-to-device user equipment for interference control and resource coordination.

Although a number of different wireless access interface arrangements may be used for D2D communications, it is likely that LTE D2D communications will be performed over spectrum allocated to LTE communications. Consequently, it has been previously proposed that when within a coverage area of an LTE network, D2D transmissions are performed the uplink spectrum and that SC-FDM is used. Furthermore, as one of the motivating factors behind D2D communication is the increase in capacity that may result, utilising the downlink spectrum for D2D communications is not appropriate.

As a result of the possible approaches to the organisation of a D2D devices and networks, a number of scenarios may arise. A selection of example scenarios are provided by FIGS. 5a to 5d where each may cause different problems regarding the allocation of resources, the operation of D2D communications alongside conventional LTE communication, and the movement of D2D capable devices between coverage areas provided by eNodeBs.

Figure 5A:
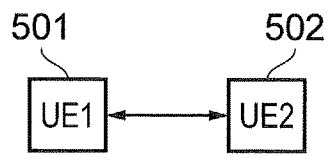
FIGS. 5a to 5d provide schematic diagrams of example device-to-device communications scenarios.

In FIG. 5a UEs 501 and 502 are outside of a coverage area of an eNodeB, consequently, the D2D devices may communicate with no or at least reduced regard for interference that may be caused by their D2D communications to neighbouring LTE networks. Such a scenario may occur in public safety communications for example, where either the UEs are outside of a coverage area or where the relevant mobile communications network is not currently functioning correctly. In such a scenario the communicating UEs may either negotiate directly with one another to allocate resources and coordinate communications, or one of the UEs or a third UE may act as a coordinating entity and therefore perform resource allocation.

Figure 5B:
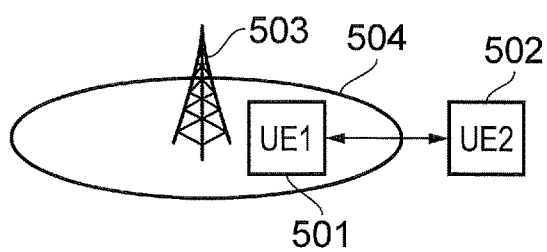

In FIG. 5b UE 501 is within a coverage area 504 of an eNodeB 503 and is performing D2D communications with UE 502 which is outside the coverage area 503. In contrast to the scenario of FIG. 5a, by virtue of UE 501 being within the coverage area of the eNodeB 503, D2D communications may cause interference to conventional LTE communications within the coverage area. Consequently, D2D resource allocations and transmissions may have to be coordinated around those within the coverage area 504 so conventional LTE communications are unaffected by D2D transmissions. This may be achieved in a number of ways, for example the eNodeB may coordinate the resource allocation for the D2D communications so that D2D resources and conventional LTE resources do not overlap. Any allocations may then be relayed to UE 502 by UE 501. Alternatively, UE 1 or UE2 via UE1 may for example perform resource allocation and then inform the eNodeB of the resources being utilised for D2D communications. The eNodeB will then reserve these resources for D2D communications.

Figure 5C:
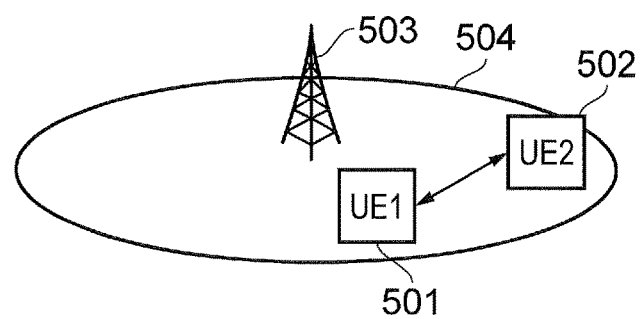

In FIG. 5c both UE 501 and 502 are within the coverage area of the eNodeB 503, consequently, coordination between the eNodeB and UEs will be required if D2D communications are to be performed without causing interference to conventional LTE communications within the coverage area. Such coordination may be achieved in a similar way to that described with reference to FIG. 5b but in the case of FIG. 5c UE 502 is also within the coverage area and therefore the relaying of resource allocation signals by UE1 to the eNodeB from UE 2 may not be required.

Figure 5D:
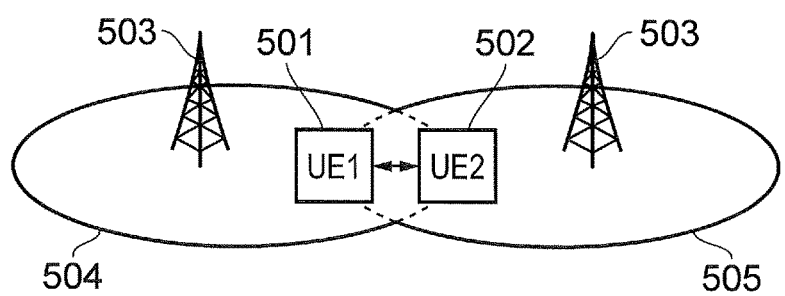

In FIG. 5d a fourth more complex D2D scenario is illustrated, where UE 501 and UE 502 are each within the coverage areas 504 505 of different eNodeBs 503 and 504 respectively. As for the scenarios of FIGS. 5b and 5c, coordination between the UEs performing D2D communications will be required if interference between D2D communications and conventional LTE communications is to be avoided. However, the presence of two eNodeB requires that resource allocations by the eNodeBs within the coverage areas 504 and 505 are required to be coordinated around the D2D resources allocations.

FIGS. 5a to 5d illustrates just four of a large number of possible D2D usage scenarios, where further scenarios may be formed from combinations of those illustrated in FIGS. 5a to 5d. For example, two UEs communicating as shown in FIG. 5a may move into the usage scenario of FIG. 5d such that there are two groups of UEs performing D2D communications in the coverage areas of two eNodeBs.

As previously described it is desirable that D2D communications cause no or as few as reasonably possible adverse effects on conventional LTE communications when within a coverage area of one or more eNodeBs. Therefore, to accomplish D2D communications in such situations, coordination is required between the UEs wishing the preform D2D communications and the serving eNodeB or predetermined knowledge of D2D resources are required, so that D2D and conventional LTE communications are not scheduled for a same set of resources. Furthermore, it is also desirable that D2D resource allocations and transmission do not interfere with and are transparent to other UEs and may operate when outside of a coverage area. Consequently, an efficient D2D resource allocation procedure which includes a form of non-centralised contention resolution is substantially transparent to other UEs is desirable.

In the foregoing description D2D communications are described with reference to an LTE system, however the presently disclosed techniques are equally applicable to other LTE system structures, other systems which are compatible with D2D communications and telecommunications systems in general.

Device-to-Device Resource Allocation and Measurement Reporting

Figure 6:
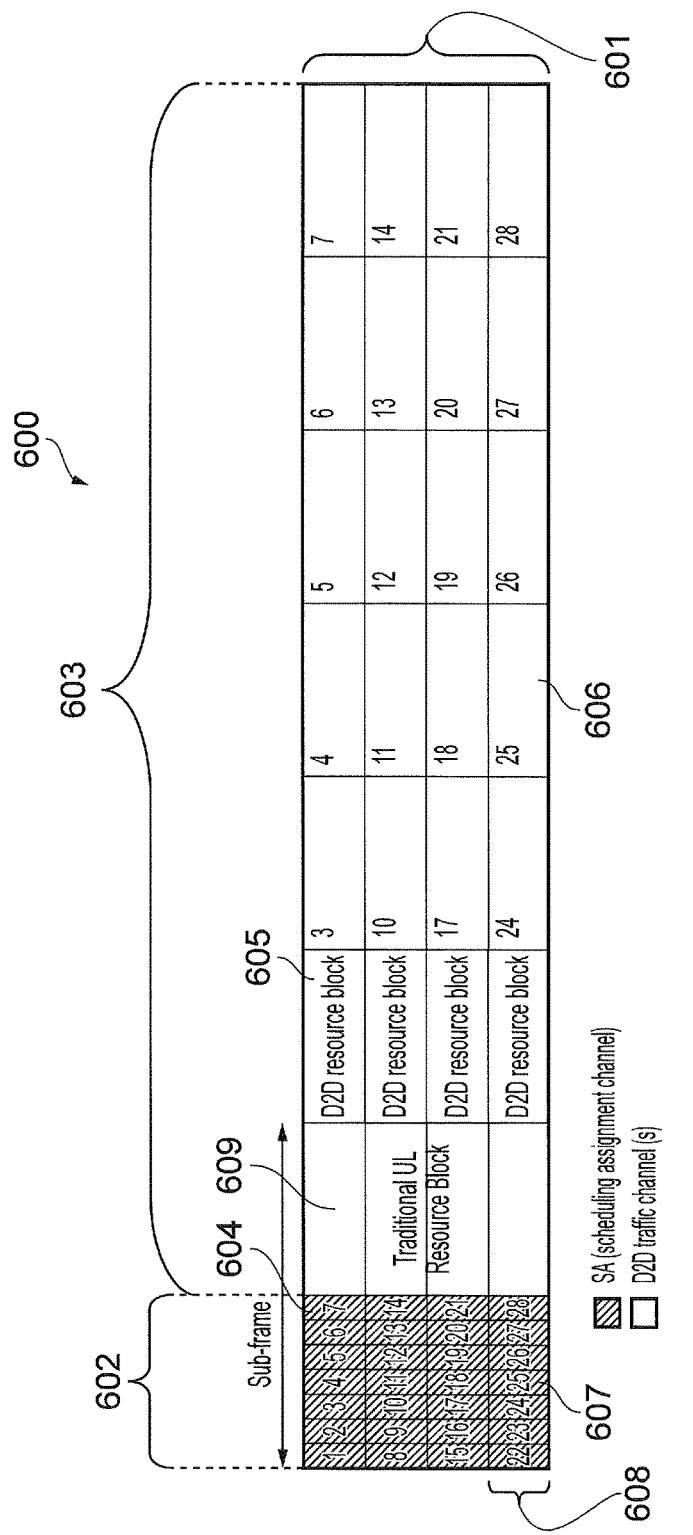
FIG. 6 provides a schematic diagram of an example structure of a device-to-device resource allocation.

FIG. 6 provides an illustration of a structure of resources 600 of a D2D wireless access interface. As previously described, it is likely that in LTE such resources will be in the uplink of an LTE wireless access interface but they may in some examples be allocated in the downlink. In FIG. 6 the resources that extend over a frequency range 601 have been allocated or reserved for D2D communications, where frequency range 601 may be predetermined, fixed or allocated dynamically by a network entity such a serving eNodeB or a device configured to act as a central coordinating entity when one or more relevant D2D devices are within a coverage area. The resources 600 of FIG. 6 are illustrated over a period of four subframes where each subframe is divided into two slots and each slot includes seven OFDM symbols, although the number of OFDM symbols may vary dependent on the cyclic prefix used. The resources 600 are divided into a control region 602 and a data or traffic region 603 which are configured for the communication of control data and user data between D2D capable UEs, respectively. In the example in FIG. 6 the control region is formed from a single LTE resource block and the traffic region is formed from seven LTE resource blocks. However, the resources of a D2D resource allocation may be divided into control and traffic regions of any required size and arrange accordingly to any desired pattern. The resources 600 may be located within an existing LTE frequency range where a serving eNodeB has reserved resources for the provision of the D2D wireless access interface, or in some example may be provided in a dedicated D2D frequency range. The resources of the traffic region are shared between UEs and information on the allocation of resources of the traffic region is conveyed in the control region as scheduling assignments, as is explained below in more detail.

A desirable feature of D2D resource allocation is that it may be performed between UEs without the need for an eNodeB or a selected UE to act as a coordinating entity. The control region of FIG. 6 is intended to achieve this. The resources of the control region and the traffic region are each divided into a plurality of resource blocks 604 and 605 respectively, where the resources blocks are illustrated as each spanning three subcarriers. However, these resource blocks are not limited to this size and as illustrated in FIG. 6 may vary in size from traditional LTE resource blocks such as 609. In FIG. 6 the control resource blocks, or the scheduling assignment blocks as they may also be referred to, are three LTE resource elements in size and the traffic resource blocks are 21 LTE resource elements in size. Each resource block of the traffic region has a corresponding resource block in the control region, where in FIG. 6 this correspondence is illustrated by the corresponding numbering. By virtue of this correspondence, transmissions in the control resource blocks may implicitly refer to a traffic resource block without any explicit signalling. However, in other examples a predetermined mapping may not be used and an explicit indication of the traffic resource blocks which signals in control resource block refer may be required. Although the use of explicit signalling may increase the adaptability of the control region it may also lead to greater overheads compared to the use of an implicit mapping.

In order to maintain a decentralised resource allocation procedure, a UE wishing to transmit to another UE provides an indication of its intention to transmit in a selected traffic region resource by providing an indication of the intended recipient, and possibly itself, in a control resource block that corresponds to the selected traffic resource block. For instance, if UE1 of a D2D group wishes to transmit data to UE2 in traffic resource block 606, UE1 will provide an indication such as a resource request message or scheduling assignment message in control resource block 607. UEs in the D2D group will be configured to monitor the control region for an indication of a transmission in which they are the intended recipient. Once a UE has detected such an indication it will then attempt to receive the data in the corresponding traffic resource block(s).

In FIG. 6 the corresponding control and traffic resource blocks are shown to be sequential in time, however in other examples the control resources may correspond to traffic resources that not sequential in time and may be separated by a plurality of subframes. The organisation of the control region and corresponding traffic regions may also be dependent on the form of contention resolution which is implemented. For example, separate listening and transmissions stages may be required to be implemented, and corresponding control and traffic resources may have to be separated in time in an interleaved manner so that contention resolution responses to resource allocation requests can be received prior to transmission in the requested resources.

Although the above procedure may achieve resource allocation for D2D communications without the need for a coordinating entity, either with or without a coordinating entity a number of problems may arise. For instance, the procedure lacks any form of interference or collision/conflict detection and therefore if two UEs within a D2D group wish to select a same traffic resource, there will likely be a conflict between both the control and traffic resources used by each UE and the associated messages on each resource. Consequently it is possible that neither the control or data traffic transmission will be able to be received correctly at the intended recipient(s). Furthermore, the transmitting UEs may not be aware of the conflict as they may not be capable of transmitting and receiving/listening simultaneously and therefore be incapable of directly detecting a conflict. This problem may be exacerbated if the intended recipients are not able to detect and estimate reliably corresponding control signals due to the conflict and therefore be unaware that a transmission has even occurred. A similar problem may occur if there is interference present in traffic resource blocks that the transmitting UEs are unaware of, as the detection and estimation of data at recipient UEs may not be able to be performed reliably. Likewise, the presence of interference in the control region itself may also be problematic because resource allocation messages may not able to be detected and estimated correctly at potential recipient UEs. In view of these potential problems it may be beneficial for a transmitting UE to be provided with an indication of interference or conflicts in the traffic or control regions at receiving UE(s) so that use of the resource which may be affected are avoided.

In accordance with the present disclosure the effects of interference and conflicting resource allocation messages may be mitigated via the introduction of a listening phase and the ability for potential recipients as well transmitting UEs to reserve traffic resources and provide indications of conflicting resource request messages. In this manner, potential recipient UEs may reserve resources in which there is interference and or provide an indication of a conflict messages such that the likelihood that resources upon which it may not be possible to receive transmissions is reduced and thus the reliability of the D2D communications improved.

The effect of interference on resources of the traffic region at a receiving UE may be mitigated by the transmission of dummy resource allocation messages in the control region. For example, if a listening UE or non-transmitting UE of a D2D group detects interference on a traffic resource, it then transmits a resource allocation request for those resources in future data regions even though it does not intend to transmit using these resources. Consequently, the resources which may be subject to the interference, such as those in the same frequency range of the interference are removed from use for data transmissions. A transmitting UE which performs contention resolution before the transmission of data will thus detect that the resources with interference are already allocated and avoid using those resources. The probability that the interference will adversely affect the data transmission is therefore reduced.

Detected interference may originate from any source, such as a co-existing communications system or a neighbouring D2D group for example. UEs within a D2D group may also monitor the control resources within a D2D resource so that interference which may affect the reception of resource allocation messages is also detected. For example, if control region interference is detected, a dummy resource allocation may be transmitted in the control region subject to the interference such that UEs performing conflict resolution will not attempt to transmit a resource allocation message in those control region resources. Thus the probability that a UE will be unable to reliably detect and estimate control data is reduced. As well as the transmission of dummy resource allocation messages, in some examples an indication of the interference may be transmitted by a listening UE, where these indications may be referred to as measurement reports. The measurement reports may, in addition to providing a simple positive or negative indication of interference via resource allocations, provide characteristics of the interference such as its strength and temporal behaviour, or in some examples the type of interference. Although this information may require additional signalling, the additional information may allow transmitting UEs to make more informed decisions with regards to resource allocation, therefore reducing the likelihood of selecting inappropriate resources to transmit over.

Although the use of dummy resource allocation messages provides an efficient solution to interference detection, due to the delay between interference detection, the resources that the dummy resource request message reserves and subsequent conflict resolution, continuity of the interference is required to be presumed. Consequently, in order to reduce the likelihood of short-term transient interference causing an undesirable prolonged drop in traffic resource capacity, temporal thresholds may have to be reached before a dummy resource request message is transmitted. Likewise, a similar situation may occur with regards to interference power, whereby unless a power threshold is reached by interference a dummy resource request may not be transmitted. For example, in the absence of such thresholds, a low level of interference may result in a dummy resource allocation request even though the interference may not adversely affect the reception of data. Consequently, it may be beneficial if both relative and absolute temporal and or power thresholds are applied to interference detection prior to transmission of dummy resource allocation requests from listening UEs. For instance, interference on a particular set of subcarriers 608 may be required to be present at a predetermined absolute power or contribute to a signal to noise ratio below a threshold for a minimum period of time before the detecting UE transmits a dummy resource allocation to prevent the use of resource formed from those subcarriers.

Although the transmission of dummy resource allocations assists in mitigating the problem of attempting to receive transmissions on resources in which there is interference, it does not address the problem of simultaneous conflicting control transmissions of UEs still attempting to transmit on resources in which there is interference.

Figure 7:
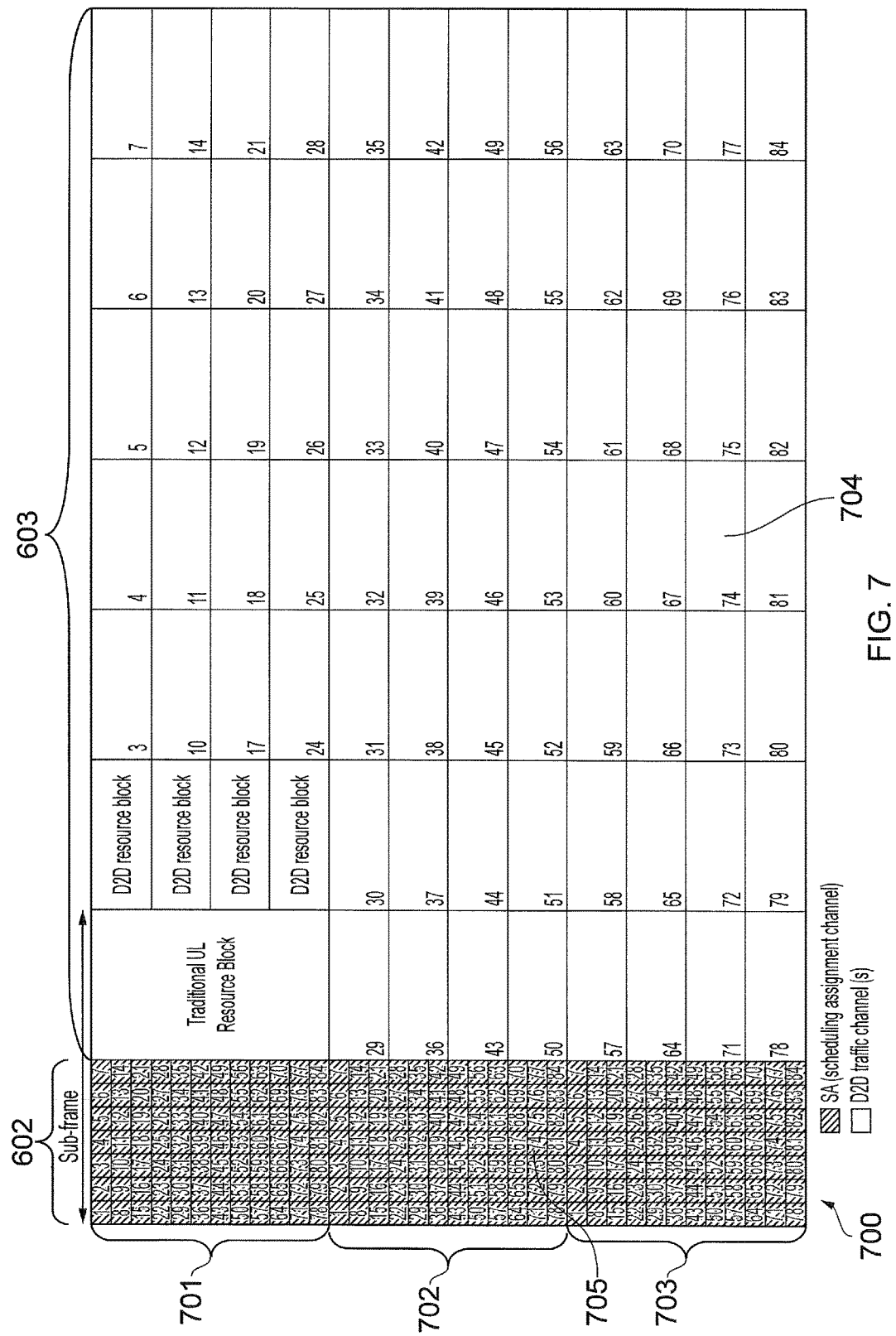
FIG. 7 provides a schematic diagram of an example structure of a device-to-device resource allocation.

In FIG. 7 another example of D2D resources 600 is shown, where the D2D resources are divided into a control region 602 and a traffic region 603. The traffic region is once again divided into a plurality of traffic resource blocks where in FIG. 7 these are numbered from 1 to 84. However the control region is split up into a plurality of control portions 701 to 703 where each portion is then divided up into 84 control resource blocks and each control resource block of each control portion corresponds to a traffic resource block or data resource blocks as they may also be referred to. The control resource blocks of the control portion 701 may be utilised by transmitting UEs in a similar to manner to that described with reference to FIG. 6, but the one or more additional control portions may be used for more sophisticated measurement reports and ACK/NACK for contention resolution for example.

In the structure of FIG. 7, instead of transmitting dummy resource allocations, UEs which have detected interference may provide an indication of the interference by sending a measurement report in the appropriate resource blocks or interference reporting blocks of the control portion 702. For example, if a UE detects interference which is likely to cause interference in traffic resource block 704, it may provide a measurement report in control resource block 705. A UE which wishes to transmit using traffic resource 704 may check control resource block 705 in order to establish whether it is possible to transmit using traffic resource 704. If a measurement report is detected in 704 the transmitting UE may then attempt to use an alternative traffic resource or may delay its transmission until the traffic resource is available. Compared to the technique described with reference to FIG. 6, the use of the second control portion allows a transmitting UE to establish that interference is the cause of inability to use a particular set of resources. Furthermore, because the second control portion is not primarily for the transmission of resource allocation requests, it may convey different formats of data which may be suitable for varying types of measurement reports.

The measurement report may take a number of forms, for example an indication of the characteristics of the interference may be provided, such as its power or any temporal characteristics. Alternatively the measurement report may simply indicate that there is interference in the corresponding traffic resource. In such a case the measurement report may consist of solely RF energy, thus simplifying both the transmission and reception of measurement reports.

The interference detection used at listening UEs may be implemented in a number of manners for the structures of both FIGS. 6 and 7. For example, the interference detection may be based on the detection of an RF signal in the relevant resources, and a measurement may be performed of the received absolute power and/or the signal to noise ratio of the desired signal compared to unwanted signals, or in a more sophisticated implementation the listening UE may attempt to decode the interference and therefore extract useful information on the source and characteristics of the interference. Furthermore, as well as detecting interference in accordance with relative and absolute power thresholds, interference may also be detected in accordance with absolute and relative temporal thresholds, as described above.

In addition to transmitting measurement reports in the control portion 702 in response to detecting interference in the traffic resources, a measurement report may also be issued by a listening UE that detects conflicting resource allocation messages in a control block of the control portion 701. For instance, if two UEs attempt to reserve a same traffic resource they are likely to transmit conflicting resource allocation message, and therefore without some form of feedback they will be unable to establish that their resource allocations may conflict. In order to reduce the likelihood of such a situation, listening UEs may be configured to detect conflicting resource allocation messages and then provide an indication of the conflicting allocations in the appropriate control element in a subsequent control portion 702.

A UE may be able to detect conflicting resource allocations by virtue of the RF signal level present in a particular control resource block, comparison of RF signal levels from different sources or by the inability to accurately detect and estimate the data transmitted on the control resource block, which may indicate that the data has been corrupted by a conflicting transmission or other form of interference. As for the structure of FIG. 6, a delay may be required between a resource allocation request and the transmission of the data in the requested resources so that the transmitting UE may receive feedback on whether there is interference/conflicting resource requests. For example, a transmitting UE may monitor a first control region in order to establish which traffic resources are free, and in a subsequent control region it will then transmits a resource allocation request for a selected set of resources. In a third control region the transmitting UE will monitor the region 702 for a measurement report indicating that there has been a conflict in the resource allocation process of the selected set of resources. If there has been no conflict the transmitting UE will then transmits its data in the relevant traffic resources. However, if there is an indicated conflict between transmissions the resource allocation process may be required to be performed from the beginning once again. This routine is just one of a number of possible implementations that may be used for resource allocation and measurement reporting using the structure of FIG. 7, for instance different timing and temporal relationships between control resource blocks and traffic resource blocks may be used.

The techniques described above with reference to FIGS. 6 and 7 introduce the ability for not only the transmitting UE or co-ordinating entity (UE or eNodeB) to reserve traffic resources, but also UEs detecting interference to reserve resources. Furthermore, receiving UEs may also detect conflicting resource allocations messages and provide an indication of a conflict to the transmitting UEs so that they may adjust their transmissions. Although the dummy resource allocation and measurements reports have been described as separate techniques, they may also be combined. For example, when using the resource structure of FIG. 7, dummy resource request may be transmitted in resource 701 when interference is detected on traffic resources but measurement reports are transmitted in resources 702 when interference or conflicting transmissions are detected in the control region 701. Alternatively, measurement reports transmitted in resources 702 may be used to indicate all forms of interference and conflicting transmissions. However, regardless of the exact implementation, the use of dummy resource allocations and or measurement reports provides a facility for contention resolution in a decentralised D2D communications system.

Figure 8:
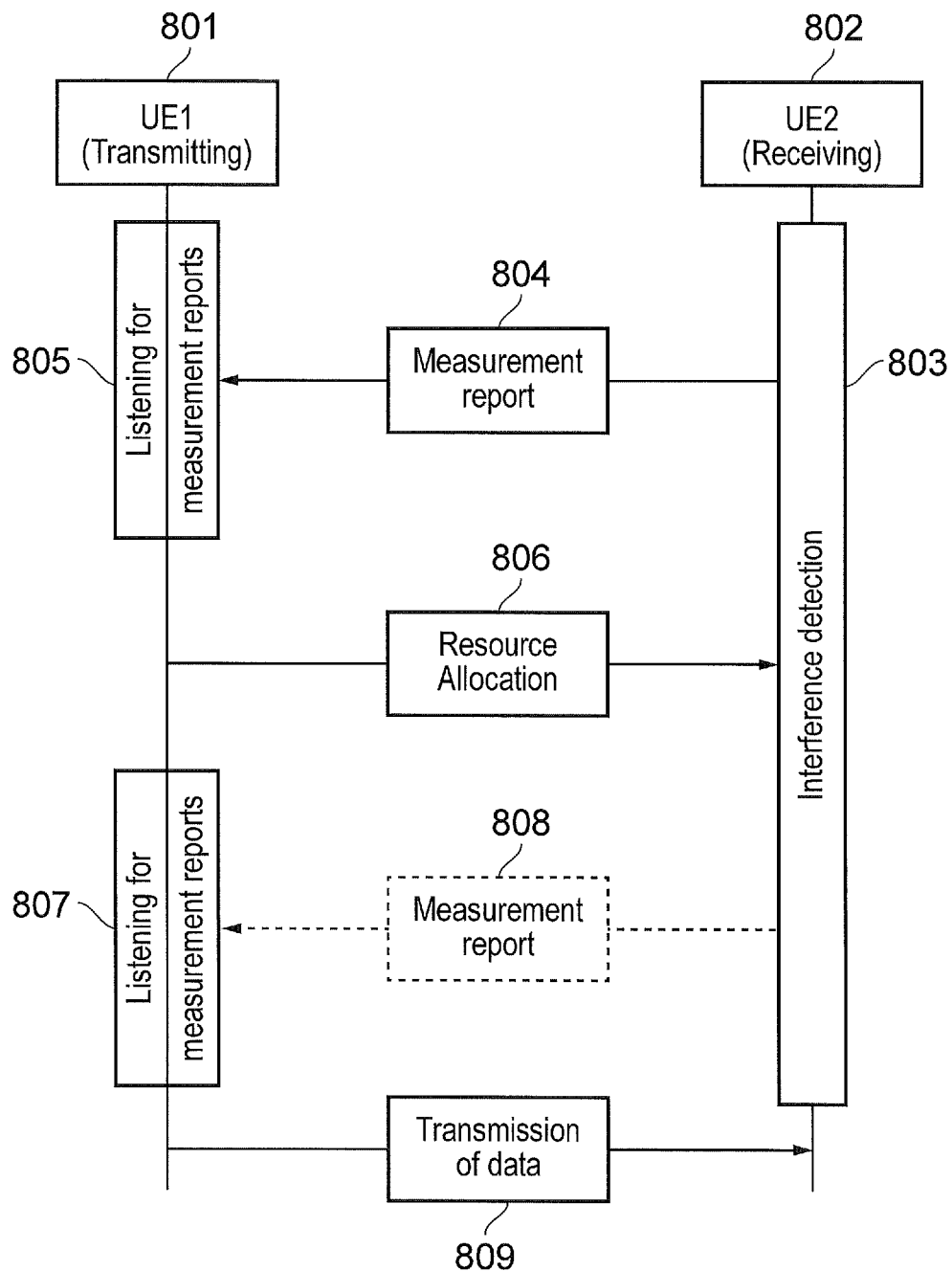
FIG. 8 provides an example message flow diagram for resource allocation and measurement reporting in device-to-device communications.

FIG. 8 provides an example message flow that may occur when performing resource allocation for the resources of FIG. 7. In FIG. 8 a first UE 801 wishes to transmit D2D communications to UE 802. UE 802 does not wish to transmit data and is therefore in a listening mode/interference detection mode 803 where it monitors the control and traffic regions for interference caused by non-D2D sources, other D2D transmissions and conflicting resource allocation requests for example. Upon detection of such potential interference or conflicting resource allocation requests UE 802 transmits a measurement report 804 in the appropriate control resources either as measurement reporting in 702 or a dummy resource allocation requests in 701. UE 801 monitors the control regions for measurement reports 805 and therefore an indication of which resources are available to use. Once UE 801 has established a potential set of unallocated resources it then sends a resource allocation request 806 in a control portion 701 informing the recipient and other UEs in the D2D of the transmission. After transmission of the resource allocation request 806, the UE 801 then may perform a second listening/monitoring phase 807 which is intended to detect measurement reports 808 which indicate that there has been a conflicting resource allocation or interference in the requested resources. Such a measurement report may be sent by any UE in the D2D group but in FIG. 8 it is illustrated as being sent by UE 802. If no relevant measurement reports are detected in the second listening phase 807, UE 801 may then proceed with transmitting 809 the data in the reserved traffic resources. If a relevant measurement report 808 is detected, UE1 may restart the resource reservation process.

Although in FIG. 8 the resource allocation message has been transmitted after a first listening period, a first listening period 805 may be not necessary and instead a 'blind' resource allocation request is transmitted, whereby only one round of measurement reporting detection/dummy resource allocation transmissions is performed by UE1. Although blind resource requests may reduce the minimum time between resource allocation requests and transmission of the data, it may result in more unsuccessful resource allocation requests. For example, because resources which include interference may be selected in the resource allocation 806, where previously these would have been avoided via a first listening period, there is an increased chance that the selection of resources will fail during the second listening period 807.

Figure 9A:
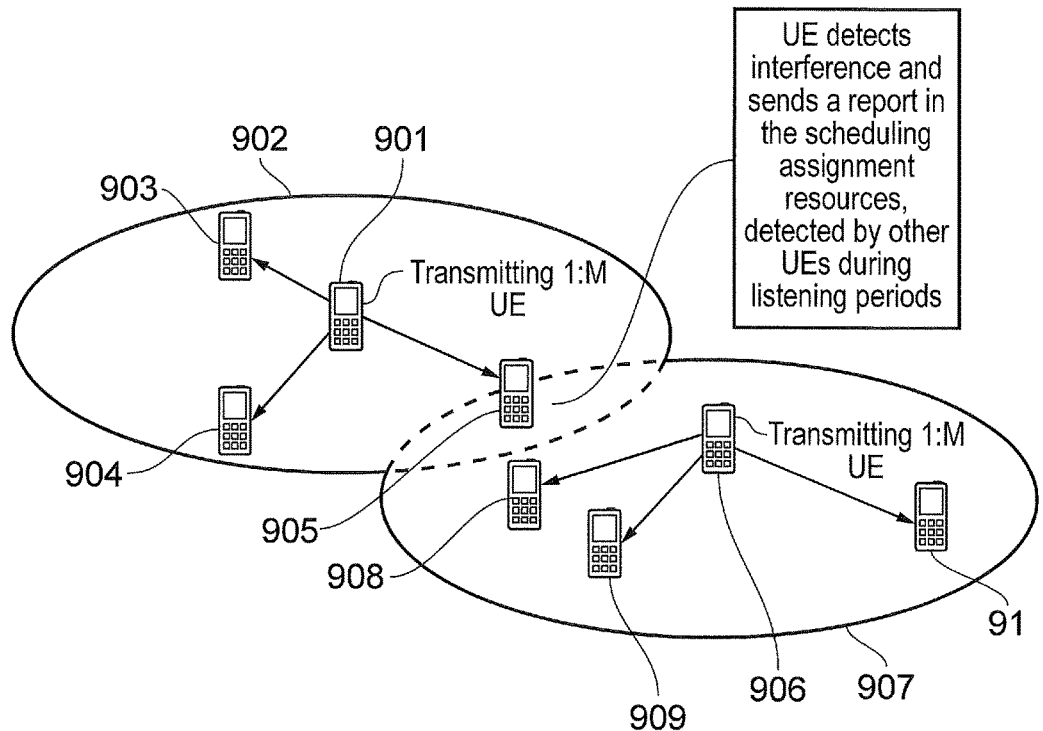
FIGS. 9a and 9b provide example device-to-device communications scenarios.
Figure 9B:
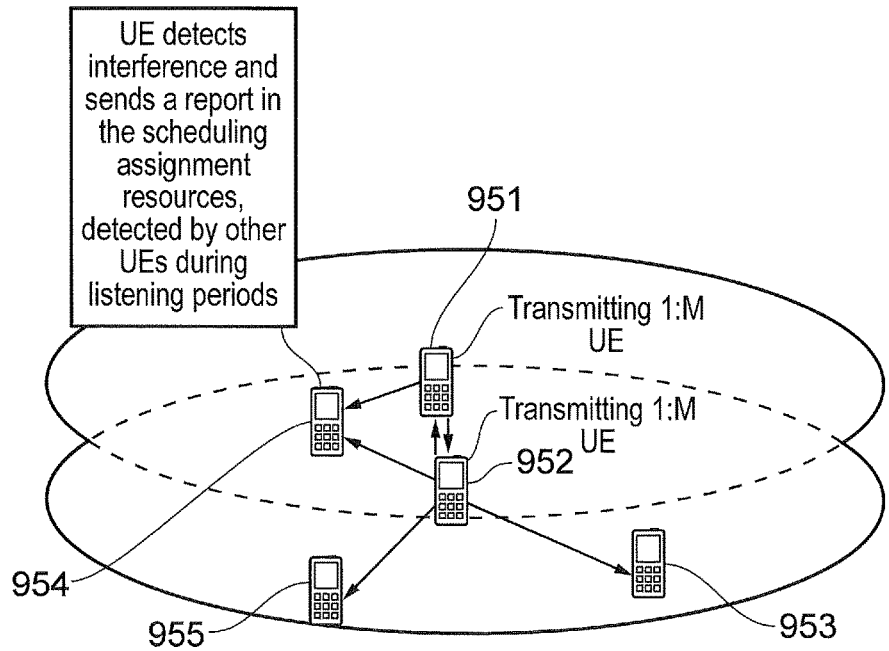

FIGS. 9a and 9b provide scenarios where the above described techniques provide an efficient interference detection and resource allocation technique which overcome a number of problems associated with such D2D scenarios.

FIG. 9a provides an illustration of a D2D communications scenario where two D2D groups partially overlap such that one or more UEs may receive signals from their D2D group but also interference from the overlapping D2D group. In FIG. 9a UE 901 wishes to transmit to UEs 903 to 905 within its coverage area 902, and UE 906 wishes to transmit to UEs 908 to 910 within its coverage area 907. However, UE 905 which is intended to receive the transmission from UE 901 will experience interference from UE 906 that may adversely affect the reception of the transmission from 901. This scenario is often referred to as the "hidden node" scenario because the transmitting UE 901 does not have knowledge of the existence or transmissions of 906 and therefore in the absence of an acknowledgment procedure may not know that 905 is unable to accurate receive the transmission. The presently disclosed techniques may reduce the likelihood of such a situation occurring because UE 905 may provide a measurement report or dummy resource allocation in the control region that indicates to UE 901 that there is interference from UE 906 in particular resources. UE 901 may then attempt to utilise alternative resources in which there is reduced interference. In this manner, although UE 901 does not have direct knowledge of the transmissions of UE 906, interference and conflicting resource allocations can be avoided. As previously described, UE 905 is not required to be able to detect and estimate the data transmitted by 906 but only detect the resources being used by 906. In some examples UE 905 may be unaware that the transmissions from 906 are D2D communications but instead simply interprets them as interference to the D2D group within coverage area 902. The interference experienced by UE 905 may not only arise from a neighbouring D2D group but also uplink transmissions from UEs communicating with an LTE cell for example. However, either interference will still be reported in an equivalent manner to that described above. For example, if the interference arises from a neighbouring LTE cell, measurement report 804 may provide an indication of this such that the likelihood of the transmitting UE selected conflicting resources with the LTE cell is reduced.

Although all UEs within a D2D group may perform interference detection and the transmission of measurement reports, some interference may only affect individual or a small number of UEs. Consequently, if interference affects UEs which the transmitting UE does not intend to transmit to, it may not be necessary for the transmitting UE to take account of the measurement reports from these UEs. This may be implemented by virtue of the measurement reports including an indication of the UE from which it originates from. Consequently, received measurement reports received at a transmitting UE can be cross-checked against the intended recipients of the transmission in order to establish which measurement reports are relevant to the transmission.

FIG. 9b provides an illustration of a scenario in which UEs within a same group wish to transmit resource allocation requests for a same set of resources in the traffic region. In a D2D group without the provision of interference indications such as measurement reports, several conflicting transmissions of both traffic and control data may occur. However, through the use of the presently disclosed technique the likelihood of these conflicts may be reduced. In FIG. 9b UEs 951 and 952 both wish to transmit to the nearby UEs 952 and 954, and 953 and 955 respectively, using a same set of resource of the traffic region. Consequently, the UEs may transmit conflicting resource requests messages that are not be able to be reliably detected and estimated at the intended recipient UEs. However, although the UEs are unable to detect each other, the UE(s) in coverage of both transmitting UEs are able to detect interference/collision and as a result send a measurement report to inform the UEs 951 952 that they need to select another resource. Although conflicting resource allocation requests may be resolved in this fashion, the scenario of FIG. 9b may lead to the transmission of multiple measurement reports in a single control resource block such that conflict and interfere with one another. Consequently, the UEs wishing to transmit in the traffic region corresponding to the control resource block may not be able to detect and estimate the measurement reports reliably. A similar problem may also occur when two or more listening UEs detect a same instance of interference and therefore transmit corresponding conflicting measurement reports. Approaches to overcome the transmissions of conflicting measurement reports are discussed in more detail below.

Figure 10:
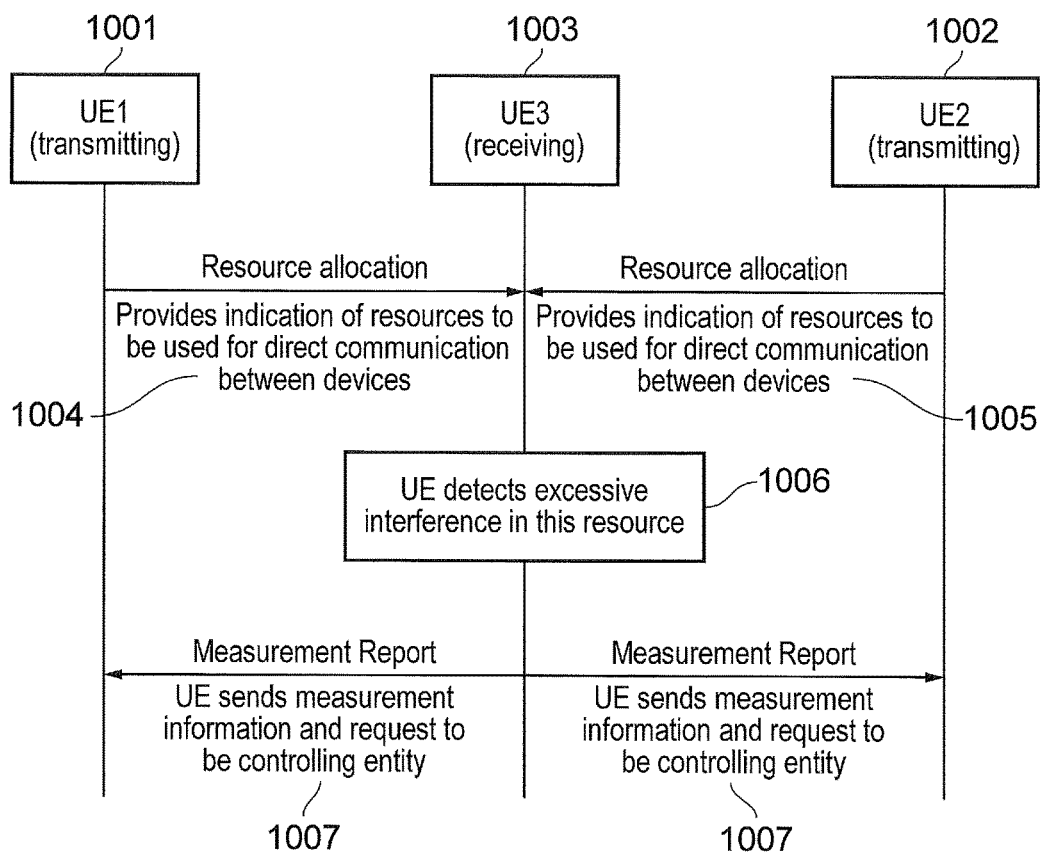
FIG. 10 provides an example message flow diagram for resource allocation and measurement reporting in device-to-device communications.

FIG. 10 provides an illustration of a potential message exchange between transmitting and receiving UEs in a D2D group where two UEs are attempting to reserve a same resource allocation. A listening UE detects the conflicting requests and reports the detected conflict to the transmitting UEs, and may additionally request to become a coordinating entity so that the likelihood of further conflicts is reduced. In a similar manner to FIG. 9b, UE1 1001 and UE2 1002 wish to transmit in resources specified in the resource allocation request messages 1004 1005. However, UE 3 1003 detects that there is a conflict between the resource allocation request via there being excessive interference 1006 in the appropriate control resource block because the resource request data can not be accurately detected and estimated. In accordance with the present technique, UE 1003 then sends a measurement report 1007 to UEs 1001 and 1002. UE1 1001 and UE2 1002 may then attempt to reserve a different set of resources. However, in some examples the UEs may request that UE3 1003 becomes a coordinating entity in order to ensure that communications transmitted by UE1 1001 and UE2 1002 does not conflict. UE3 1003 may then submit resource allocation requests on behalf of both UE1 1001 and UE2 1002.

Measurement Report Conflict Resolution

Although the use of measurement reports may reduce the likelihood of conflicting transmissions and the transmission of data in traffic resources that have excessive interference, the sending of measurement reports themselves may lead to conflicting transmissions. For example, if two UEs both wish to report interference in a particular interference reporting block it is likely that they will transmit conflicting measurement reports. A situation such as this likely to occur in D2D groups because more than one UE may be monitoring for interference, and it is likely that any interference is not limited to a single UE as shown in FIG. 9a. The occurrence of conflicting measurement reports may not cause a significant problem if the detection of the measurement reports simply consists of measuring an RF signal in the appropriate control portion element, however this would not be the case for measurement reports containing more detailed information which needs to be decoded. Furthermore, it would also not be possible for a transmitting D2D UE to establish from which UEs the measurement reports originate and therefore whether the measurement reports are relevant to their transmissions.

A number of possible approaches may be used to reduce the likelihood of conflicting measurement reports. For example, code division multiplexing may be used whereby different UEs each use a different code to transmit their measurement reports. This would therefore allow receiving UEs to distinguish and decode measurement report received at the same time over the same frequency resources. The UEs transmitting the measurement reports may have been allocated a code or are required to randomly select a code from a predetermined set of codes. The receiving UEs may be required to have knowledge of the all the possible codes and then perform blind detection on the received signals representing the measurement reports. Although this is more complex approach than simple RF signal detection, it allows the transmissions of increased quantities of data in measurement reports. This approach is analogous to the random access procedure which utilises the physical random access channel (PRACH) and therefore implementation of such a code division multiplexing approach may be simplified by utilising elements of the existing random access procedure.

In an alternative example the transmission of the measurement reports may be randomised. For instance, a probability may be associated with the transmission of a measurement report such that after detection of interference at a UE, the UE has a predetermined probability of sending an associated measurement report. Although this may reduce the likelihood of conflicting measurement reports when multiple UEs detect a single instance of interference, it may result in no interference measurements being transmitted when a low number or only a single UE detects interference. To reduce the likelihood of such a situation occurring, it may be desirable to apply a probability of responding proportional to the number of UEs in a D2D communications group. For example, a 10% probability may be used in a group that includes 10 UEs so that on average one UE should transmit a measurement report if they all experience the same interference.

In another example the resources used to transmit the measurement report may be randomised in order to avoid collision. The number of random possibilities may then be configured to ensure that there is sufficient probability that at least one report will be decodable and the information in the report will identify which resource is in use. However, by using a randomised resource it may not be possible to maintain a predetermined mapping between control resource blocks and traffic resources blocks and therefore additional data may have to be transmitted with randomised measurement report transmission in order to provide an explicit indication of the relevant traffic resource block.

Figure 11:
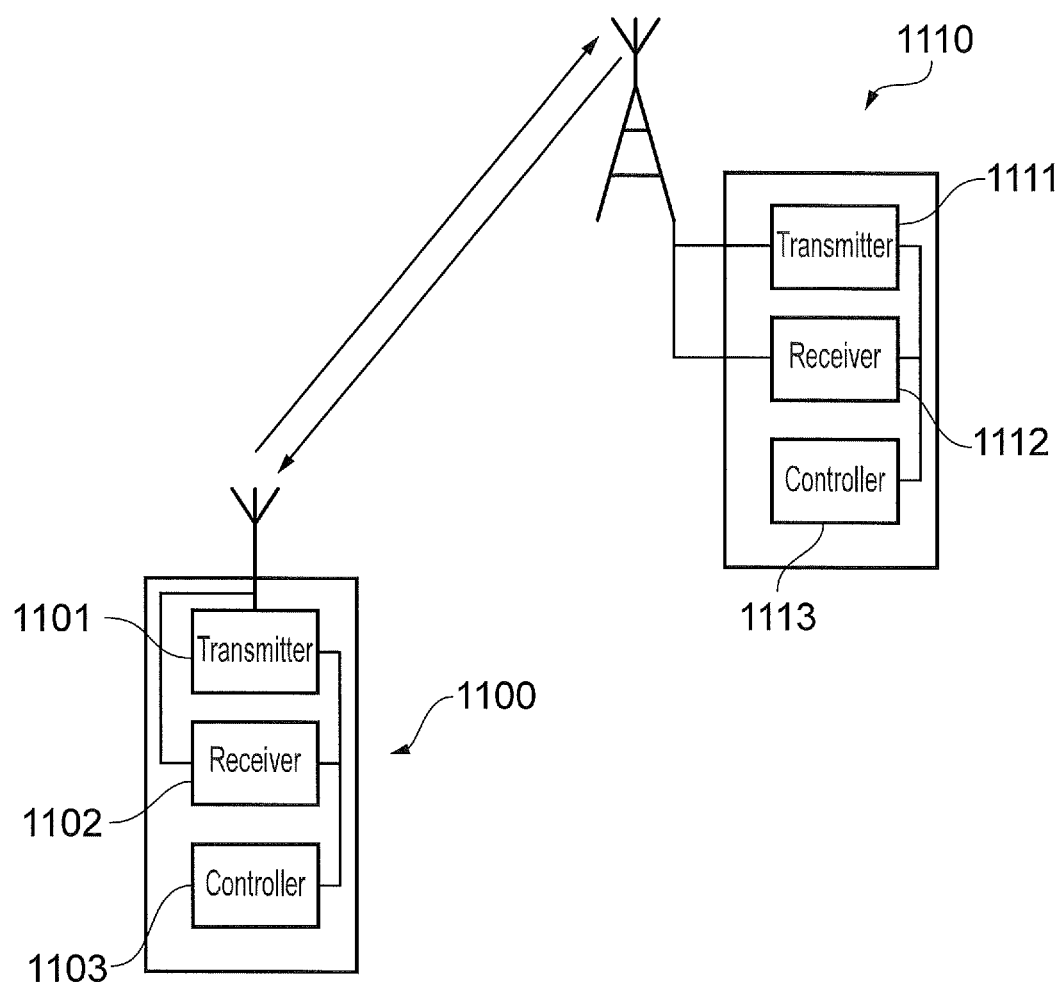
FIG. 11 provides a schematic diagram of a communications device and a network entity of a mobile communications system.

FIG. 11 provides a schematic diagram of a UE 1100 and an eNodeB 1110 in which examples of the presently disclosed technique may be implemented. The UE includes a transmitter 1101, a receiver 1102 and a controller 1103 where the controller is configured to control the receiver 1102 to detect signals representing control data and user data transmitted by the eNodeB 1110, and to estimate the data conveyed by the signals. The controller 1103 is also configured to control the transmitter 1101 to transmit signals representing uplink control data and user data to the eNodeB. In examples where the UE 1100 is capable of performing D2D communications, the controller is also configured to control the transmitter 1101 and the receiver 1102 to transmit and receive signals representing D2D control and user data to an from an eNodeB and other UEs, and to detect interference and conflicting transmissions in resources of a D2D wireless access interface. The UE 1100 may also be configured to acts as a coordinating entity in a D2D group when members are out of coverage of an eNodeB. In such circumstances the controller 1103 will be configured to control the transmitter 1101 to transmit D2D control data as well as user data and also be configured to allocate identifiers to D2D communications links and allocate resources of the wireless access interface to D2D communications links. Although in FIG. 11 the UE 1100 is illustrated as comprising a separate transmitter and receiver, it may instead comprise a transceiver which is configured in combination with the controller to implement the aforementioned features and techniques. The controller 1103 may comprise a processor unit which is suitably configured/programmed to provide the desired functionality described herein using conventional programming/configuration techniques for equipment in wireless telecommunications systems. The transmitter 1101, receiver 1102 and controller 1103 are schematically shown in FIG. 11 as separate elements for ease of representation. However, it will be appreciated the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the UE 1100 will in general comprise various other elements associated with its operating functionality in accordance with established wireless telecommunications techniques (e.g. a power source, possibly a user interface, and so forth).

The eNodeB 1110 includes a transmitter 1111, a receiver 1112 and a controller 1113, where the controller 1113 is configured to control the transmitter 1111 to transmit signals representing control data and user data to UEs within a coverage area such as the UE 1100, thus providing a wireless access interface to UEs within the coverage area. The controller 1113 is also configured to control the receiver 1113 to detect signals representing user control and uplink data and estimate the data conveyed by these signals. When D2D capable UEs are within the coverage area of the eNodeB 1110 the controller 1113 at the eNodeB may also acts as a coordinating entity thereby allocating identifiers to D2D communications links and allocating resources of the wireless access interface to D2D communications links. Although in FIG. 11 the eNodeB 1110 is illustrated as comprising a separate transmitter and receiver, it may instead comprise a transceiver which is configured in combination with the controller to implement the aforementioned features and techniques at the eNodeB. The controller 1113 may comprise a processor unit which is suitably configured/programmed to provide the desired functionality described herein using conventional programming/configuration techniques for equipment in wireless telecommunications systems. The transmitter 1111, receiver 1112 and controller 1113 are schematically shown in FIG. 11 as separate elements for ease of representation. However, it will be appreciated that the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the eNodeB 1110 will in general comprise various other elements associated with its operating functionality in accordance with established wireless telecommunications techniques. For example, the eNodeB 1110 will in general comprise a scheduling entity responsible for scheduling communications. The functionality of the scheduling entity may, for example, be subsumed by the controller 1113.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

The following numbered clauses provide further aspects and examples of the present disclosure:

1. A communications device comprising a transmitter for transmitting signals representing device-to-device communications to a second communications device across a wireless access interface, a receiver for receiving signals representing device-to-device communication from the second communications device across the wireless access interface, the wireless access interface including a control resource for communicating control data between communications devices and a data resource for communicating user data between communications devices, the control data providing scheduling assignments for the allocation of resources of the data resource, and a controller for controlling the transmitter and the receiver to perform interference detection in one or more of the control resource and the data resource, and to transmit in the control resources, in response to detecting interference in one or more of the control resource and the data resource, signals representing an indication of the detected interference to the second communications device.

2. A communications device according to clause 1, wherein the control resource includes one or more scheduling assignment blocks and the data resource includes one or more traffic resource blocks, each scheduling assignment block being mapped to a traffic resource block according to a predetermined mapping whereby scheduling assignments for a traffic resource block are transmitted in the corresponding scheduling assignment block, and the controller is configured to control the transmitter to transmit, in response to detecting interference in at least one traffic resource block, signals representing an indication of the interference in one or more scheduling assignment blocks that map to the at least one traffic resource block.

3. A communications device according to clauses 1 or 2, wherein the signals representing an indication of the interference are a scheduling assignment for the communications device, the scheduling assignment indicating the resources blocks in a frequency range in which the interference was detected.

4. A communications device according to clause 1, wherein the control resource includes a one or more scheduling assignment blocks and one or more corresponding interference reporting blocks, and the data resource includes one or more traffic resource blocks, each corresponding scheduling assignment block and interference reporting block being mapped to a traffic resource block according to a predetermined mapping, and the controller is configured to control the transmitter to transmit, in response to detecting interference in at least one traffic resource block, the signals representing an indication of the interference in one or more interference reporting blocks that map to the at least one traffic resource block.

5. A communications device according to any preceding clause, wherein the controller is configured to control the transmitter to transmit the signals representing an indication of the detected interference in accordance with a predefined probability.

6. A communications device according to any preceding clause, wherein the controller is configured to control the transmitter to transmit the signals representing an indication of the interference in conjunction with a predefined identifying sequence, the sequence being associated with the communications device.

7. A communications device according to any preceding clause, wherein the interference detection includes detecting a radio-frequency signal in one or more of the control resource and the data resource.

8. A communications device according to any preceding clause, wherein the signals representing an indication of the interference include information on the characteristics of the detected interference.

9. A communications device according to clause 1, wherein the control resource includes one or more scheduling assignment blocks and one or more corresponding interference reporting blocks, and the data resource includes one or more traffic resource blocks, each corresponding scheduling assignment block and interference reporting block being mapped to a traffic resource block according to a predetermined mapping, and the controller is configured to control the transmitter to transmit, in response to detecting interference in at least one scheduling assignment block, the signals representing an indication of the interference in one or more interference reporting blocks that correspond to the at least one scheduling assignment block.

10. A communications device comprising
a transmitter for transmitting signals representing device-to-device communications to a second communications device across a wireless access interface,
a receiver for receiving signals representing device-to-device communication from the second communications device across the wireless access interface, the wireless access interface including a control resource for the communication of control data between communications device and a data resource for the communication of user data between communications devices, the control data providing scheduling assignments for the allocation of resources of the data resource, and
a controller for controlling the transmitter and the receiver to receive in the control region signals representing an indication of interference detected in one or more of the resources of the control resource and the data resource by the second communications device, and to transmit a scheduling assignment message indicating a set of resources of the data resources to the second communications device, wherein the set of resources does not include the resources indicated in the signals representing an indication of detected interference received from the second communications device.

11. A communications device according to clause 10, wherein the signals representing an indication of the interference are a scheduling assignment transmitted by the second communication device, the scheduling assignment indicating resource blocks in a frequency band in which the interference was detected.

12. A communications device according to clauses 10 or 11, wherein the control resource includes one or more scheduling assignment blocks and the data resource includes a one or more traffic resource blocks, each scheduling assignment block being mapped to a traffic resource block according to a predetermined mapping whereby scheduling assignments for a traffic resource block are transmitted in the corresponding scheduling assignment block, and the controller is configured to control the receiver to receive the signals representing an indication of the interference in one or more of the scheduling assignment blocks, the one or more scheduling blocks mapping to the one or more traffic resource blocks in which the interference was detected.

13. A communications device according to clauses 10 or 11, wherein the control resource includes one or more scheduling assignment blocks and one or more corresponding interference reporting blocks, and the data resource includes one or more traffic resource blocks, each corresponding scheduling assignment block and interference reporting block being mapped to a traffic resource block according to a predetermined mapping, and the controller is configured to control the receiver to receive the signals representing an indication of the interference in one or more of the interference reporting blocks, the one or more interference reporting blocks mapping to the one or more traffic resource blocks in which the interference was detected.

14. A communications device according to clauses 10 or 11, wherein the control resource includes one or more scheduling assignment blocks and one or more corresponding interference reporting blocks, and the data resource includes one or more traffic resource blocks, each corresponding scheduling assignment block and interference reporting block being mapped to a traffic resource block according to a predetermined mapping, and the controller is configured to control the receiver to receive the signals representing an indication of the interference in one or more of the interference reporting blocks, the one or more interference reporting blocks corresponding to the one or more scheduling assignment blocks in which the interference was detected.

15. A method for performing device-to-device communications at a communications device, the method including transmitting signals representing device-to-device communications to a second communications device across a wireless access interface, receiving signals representing device-to-device communication from the second communications device across the wireless access interface, the wireless access interface including a control resource for communicating control data between communications devices and a data resource for communicating user data between communications devices, the control data providing scheduling assignments for the allocation of resources of the data resource, and controlling a transmitter and a receiver to perform interference detection in one or more of the control resource and the data resource, and to transmit in the control resources, in response to detecting interference in one or more of the control resource and the data resource, signals representing an indication of the detected interference to the second communications device.

16. A method for performing device-to-device communications at a communication device, the method including transmitting signals representing device-to-device communications to a second communications device across a wireless access interface, receiving signals representing device-to-device communication from the second communications device across the wireless access interface, the wireless access interface including a control resource for the communication of control data between communications device and a data resource for the communication of user data between communications devices, the control data providing scheduling assignments for the allocation of resources of the data resource, and controlling the transmitter and the receiver to receive in the control region signals representing an indication of interference detected in one or more of the resources of the control resource and the data resource by the second communications device, and to transmit a scheduling assignment message indicating a set of resources of the data resources to the second communications device, wherein the set of resources does not include the resources indicated in the signals representing an indication of detected interference received from the second communications device.

17. Circuitry for a communications device of a wireless communications system, the circuitry comprising transmitter circuitry for transmitting signals representing device-to-device communications to a second communications device across a wireless access interface, receiver circuitry for receiving signals representing device-to-device communication from the second communications device across the wireless access interface, the wireless access interface including a control resource for communicating control data between communications devices and a data resource for communicating user data between communications devices, the control data providing scheduling assignments for the allocation of resources of the data resource, and controller circuitry for controlling the transmitter circuitry and the receiver circuitry to perform interference detection in one or more of the control resource and the data resource, and to transmit in the control resources, in response to detecting interference in one or more of the control resource and the data resource, signals representing an indication of the detected interference to the second communications device.

18. Circuitry for a communications device of a wireless communications system, the circuitry comprising transmitter circuitry for transmitting signals representing device-to-device communications to a second communications device across a wireless access interface, receiver circuitry for receiving signals representing device-to-device communication from the second communications device across the wireless access interface, the wireless access interface including a control resource for the communication of control data between communications device and a data resource for the communication of user data between communications devices, the control data providing scheduling assignments for the allocation of resources of the data resource, and controller circuitry for controlling the transmitter circuitry and the receiver circuitry to receive in the control region signals representing an indication of interference detected in one or more of the resources of the control resource and the data resource by the second communications device, and to transmit a scheduling assignment message indicating a set of resources of the data resources to the second communications device, wherein the set of resources does not include the resources indicated in the signals representing an indication of detected interference received from the second communications device.

REFERENCES

[1] R2-133840, "CSMA/CA based resource selection," Samsung, published at 3GPP TSG-RAN WG2 #84, San Francisco, USA, 11-15 Nov. 2013.
[2] R2-133990, "Network control for Public Safety D2D Communications", Orange, Huawei, HiSilicon, Telecom Italia, published at 3GPP TSG-RAN WG2 #84, San Francisco, USA, 11-15 Nov. 2013.
[3] R2-134246, "The Synchronizing Central Node for Out of Coverage D2D Communication", General Dynamics Broadband UK, published at 3GPP TSG-RAN WG2 #84, San Francisco, USA, 11-15 Nov. 2013.
[4] R2-134426, "Medium Access for D2D communication", LG Electronics Inc, published at 3GPP TSG-RAN WG2 #84, San Francisco, USA, 11-15 Nov. 2013.
[5] R2-134238, "D2D Scheduling Procedure", Ericsson, published at 3GPP TSG-RAN WG2 #84, San Francisco, USA, 11-15 Nov. 2013.
[6] R2-134248, "Possible mechanisms for resource selection in connectionless D2D voice communication", General Dynamics Broadband UK, published at 3GPP TSG-RAN WG2 #84, San Francisco, USA, 11-15 Nov. 2013.
[7] R2-134431, "Simulation results for D2D voice services using connectionless approach", General Dynamics Broadband UK, published at 3GPP TSG-RAN WG2 #84, San Francisco, USA, 11-15 Nov. 2013.
[8] "D2D Resource Allocation under the Control of BS", Xiaogang R. et al, University of Electronic Science and Technology of China, https://mentor.ieee.org/802.16/dcn/13/16-13-0123-02-000n-d2d-resource-allocation-under-the-control-of-bs.docx
[9] US20130170387
[10] US20120300662
[11] LTE for UMTS: OFDMA and SC-FDMA Based Radio Access, Harris Holma and Antti Toskala, Wiley 2009, ISBN 978-0-470-99401-6.

The invention claimed is:

1. A mobile communications device comprising:
   a transmitter for transmitting signals representing device-to-device communications to a second mobile communications device across a wireless access interface,
   a receiver for receiving signals representing device-to-device communication from the second mobile communications device across the wireless access interface, the wireless access interface comprising a control resource for communicating control data between the mobile communications devices and a data resource for communicating user data between the mobile communications devices, the control data providing scheduling assignments for the allocation of resources of the data resource, and
   a controller for controlling the transmitter and the receiver to perform interference detection in one or more of the control resource and the data resource, and to transmit in the control resources, in response to detecting interference in one or more of the control resource and the data resource, signals representing an indication of the detected interference to the second mobile communications device,
   wherein the signals representing the indication of the interference comprise information on the temporal characteristics of the detected interference, and
   wherein the signals representing the indication of the interference are not transmitted unless the temporal characteristics of the detected interference exceed a threshold amount of time.

2. A mobile communications device as claimed in claim 1, wherein the control resource comprises one or more scheduling assignment blocks and the data resource comprises one or more traffic resource blocks, each scheduling assignment block being mapped to a traffic resource block according to a predetermined mapping whereby scheduling assignments for a traffic resource block are transmitted in the corresponding scheduling assignment block, and the controller is configured to control the transmitter to transmit, in response to detecting interference in at least one traffic resource block, signals representing an indication of the interference in one or more scheduling assignment blocks that map to the at least one traffic resource block.

3. A mobile communications device as claimed in claim 1, wherein the signals representing an indication of the interference are a scheduling assignment for the mobile communications device, the scheduling assignment indicating the resources blocks in a frequency range in which the interference was detected.

4. A mobile communications device as claimed in claim 1, wherein the control resource comprises a one or more scheduling assignment blocks and one or more corresponding interference reporting blocks, and the data resource comprises one or more traffic resource blocks, each corresponding scheduling assignment block and interference reporting block being mapped to a traffic resource block according to a predetermined mapping, and the controller is configured to control the transmitter to transmit, in response to detecting interference in at least one traffic resource block, the signals representing an indication of the interference in one or more interference reporting blocks that map to the at least one traffic resource block.

5. A mobile communications device as claimed in claim 1, wherein the controller is configured to control the transmitter to transmit the signals representing an indication of the detected interference in accordance with a predefined probability.

6. A mobile communications device as claimed in claim 1, wherein the controller is configured to control the transmitter to transmit the signals representing an indication of the interference in conjunction with a predefined identifying sequence, the sequence being associated with the mobile communications device.

7. A mobile communications device as claimed in claim 1, wherein the interference detection comprises detecting a radio-frequency signal in one or more of the control resource and the data resource.

8. A mobile communications device as claimed in claim 1, wherein the control resource comprises one or more scheduling assignment blocks and one or more corresponding interference reporting blocks, and the data resource comprises one or more traffic resource blocks, each corresponding scheduling assignment block and interference reporting block being mapped to a traffic resource block according to a predetermined mapping, and the controller is configured to control the transmitter to transmit, in response to detecting interference in at least one scheduling assignment block, the signals representing an indication of the interference in one or more interference reporting blocks that correspond to the at least one scheduling assignment block.

9. A mobile communications device comprising:
   a transmitter for transmitting signals representing device-to-device communications to a second mobile communications device across a wireless access interface,
   a receiver for receiving signals representing device-to-device communication from the second mobile communications device across the wireless access interface, the wireless access interface comprising a control resource for the communication of control data between the mobile communications devices and a data resource for the communication of user data between the mobile communications devices, the control data providing scheduling assignments for the allocation of resources of the data resource, and
   a controller for controlling the transmitter and the receiver to receive in the control region signals representing an indication of interference detected in one or more of the resources of the control resource and the data resource by the second mobile communications device, and to transmit a scheduling assignment message indicating a set of resources of the data resources to the second mobile communications device, wherein the set of resources does not include the resources indicated in the signals representing an indication of detected interference received from the second mobile communications device,
   wherein the signals representing an indication of the interference comprise information on the temporal characteristics of the detected interference, and
   wherein the signals representing the indication of the interference are not received unless the temporal characteristics of the detected interference exceed a threshold amount of time.

10. A mobile communications device as claimed in claim 9, wherein the signals representing an indication of the interference are a scheduling assignment transmitted by the second communication device, the scheduling assignment indicating resource blocks in a frequency band in which the interference was detected.

11. A mobile communications device as claimed in claim 9, wherein the control resource comprises one or more scheduling assignment blocks and the data resource comprises a one or more traffic resource blocks, each scheduling assignment block being mapped to a traffic resource block according to a predetermined mapping whereby scheduling assignments for a traffic resource block are transmitted in the corresponding scheduling assignment block, and the controller is configured to control the receiver to receive the signals representing an indication of the interference in one or more of the scheduling assignment blocks, the one or more scheduling blocks mapping to the one or more traffic resource blocks in which the interference was detected.

12. A mobile communications device as claimed in claim 9, wherein the control resource comprises one or more scheduling assignment blocks and one or more corresponding interference reporting blocks, and the data resource comprises one or more traffic resource blocks, each corresponding scheduling assignment block and interference reporting block being mapped to a traffic resource block according to a predetermined mapping, and the controller is configured to control the receiver to receive the signals representing an indication of the interference in one or more of the interference reporting blocks, the one or more interference reporting blocks mapping to the one or more traffic resource blocks in which the interference was detected.

13. A mobile communications device as claimed in claim 9, wherein the control resource comprises one or more scheduling assignment blocks and one or more corresponding interference reporting blocks, and the data resource comprises one or more traffic resource blocks, each corresponding scheduling assignment block and interference reporting block being mapped to a traffic resource block according to a predetermined mapping, and the controller is configured to control the receiver to receive the signals representing an indication of the interference in one or more of the interference reporting blocks, the one or more interference reporting blocks corresponding to the one or more scheduling assignment blocks in which the interference was detected.

14. Circuitry for a mobile communications device of a wireless communications system, the circuitry comprising:
   transmitter circuitry for transmitting signals representing device-to-device communications to a second mobile communications device across a wireless access interface,
   receiver circuitry for receiving signals representing device-to-device communication from the second mobile communications device across the wireless access interface, the wireless access interface comprising a control resource for communicating control data between mobile communications devices and a data resource for communicating user data between mobile communications devices, the control data providing scheduling assignments for the allocation of resources of the data resource, and
   controller circuitry for controlling the transmitter circuitry and the receiver circuitry to perform interference detection in one or more of the control resource and the data resource, and to transmit in the control resources, in response to detecting interference in one or more of the control resource and the data resource, signals representing an indication of the detected interference to the second mobile communications device,
   wherein the signals representing an indication of the interference comprise information on the characteristics of the detected interference, and
   wherein the signals representing the indication of the interference are not transmitted unless the temporal characteristics of the detected interference exceed a threshold amount of time.

15. Circuitry for a mobile communications device of a wireless communications system, the circuitry comprising:
   transmitter circuitry for transmitting signals representing device-to-device communications to a second mobile communications device across a wireless access interface,
   receiver circuitry for receiving signals representing device-to-device communication from the second mobile communications device across the wireless access interface, the wireless access interface comprising a control resource for the communication of control data between the mobile communications devices and a data resource for the communication of user data between the mobile communications devices, the control data providing scheduling assignments for the allocation of resources of the data resource, and
   controller circuitry for controlling the transmitter circuitry and the receiver circuitry to receive in the control region signals representing an indication of interference detected in one or more of the resources of the control resource and the data resource by the second mobile communications device, and to transmit a scheduling assignment message indicating a set of resources of the data resources to the second mobile communications device, wherein the set of resources does not include the resources indicated in the signals representing an indication of detected interference received from the second mobile communications device,
   wherein the signals representing an indication of the interference comprise information on the temporal characteristics of the detected interference, and
   wherein the signals representing the indication of the interference are not received unless the temporal characteristics of the detected interference exceed a threshold amount of time.

* * * * *